United States Patent
Shi et al.

(10) Patent No.: US 7,427,363 B2
(45) Date of Patent: Sep. 23, 2008

(54) COMPOSITION FOR FORMING LIQUID CRYSTAL FILM, OPTICALLY ANISOTROPIC FILM, AND PRODUCTION METHOD THEREOF

(75) Inventors: Zemin Shi, Tochigi (JP); Tadashi Akamatsu, Tochigi (JP); Michio Sato, Tochigi (JP); Tsuneo Hanada, Tochigi (JP)

(73) Assignee: Sony Chemical & Information Device Corporation, Tokyo (JP)

( * ) Notice: Subject to any disclaimer, the term of this patent is extended or adjusted under 35 U.S.C. 154(b) by 3 days.

(21) Appl. No.: 10/581,747

(22) PCT Filed: Aug. 31, 2004

(86) PCT No.: PCT/JP2004/012527

§ 371 (c)(1),
(2), (4) Date: Jun. 6, 2006

(87) PCT Pub. No.: WO2005/057258

PCT Pub. Date: Jun. 23, 2005

(65) Prior Publication Data

US 2007/0114491 A1    May 24, 2007

(30) Foreign Application Priority Data

Dec. 12, 2003   (JP)   ............ 2003-415763

(51) Int. Cl.
C09K 19/00   (2006.01)
C09K 19/52   (2006.01)

(52) U.S. Cl. ............... 252/299.01; 430/20; 428/1.1

(58) Field of Classification Search ........... 252/299.01; 430/20; 428/1.1
See application file for complete search history.

(56) References Cited

U.S. PATENT DOCUMENTS 6,191,836 B1 * 2/2001 Woo et al. ............... 349/124
7,138,185 B2 * 11/2006 Obayashi et al. ............ 428/447
2005/0259203 A1 * 11/2005 Kimura et al. ............ 349/124

FOREIGN PATENT DOCUMENTS

| JP | 09157419 A * | 6/1997 |
|---|---|---|
| JP | A-2000-098134 | 4/2000 |
| JP | A-2001-055573 | 2/2001 |
| JP | A-2002-148600 | 5/2002 |
| JP | A-2002-214610 | 7/2002 |
| JP | A-2003-227935 | 8/2003 |
| JP | A-2003-251643 | 9/2003 |

\* cited by examiner

*Primary Examiner*—Geraldina Visconti
(74) *Attorney, Agent, or Firm*—Oliff & Berridge, PLC

(57) ABSTRACT

A simple technique for introducing a hybrid alignment or a homeotropic (vertical) alignment into liquid crystal films, which, by their nature, tend to have a horizontal alignment of liquid crystal molecules. The technique does not require special alignment films.

A liquid crystal composition for forming a liquid crystal film contains a polymerizable liquid crystal compound and a hydrolysate of an alkoxysilane compound. The hydrolysate of the alkoxysilane compound contains a siloxane oligomer of which degree of polymerization is from 2 to 25. Furthermore, the alkoxysilane compound is a trialkoxysilane compound having a functional group. This liquid crystal film composition can be produced by hydrolyzing an alkoxysilane compound to obtain a hydrolysate and then uniformly mixing the hydrolysate with a polymerizable liquid crystal compound. Alternatively, it can be obtained by uniformly mixing the alkoxysilane compound with the polymerizable liquid crystal compound and subsequently hydrolyzing the alkoxysilane compound in the mixture. One mole of the alkoxysilane compound is preferably hydrolyzed with 0.1 d to 2.0 d mol of water, given that the number of alkoxyl groups in a molecule of the alkoxysilane compound is d. An optically anisotropic film can be obtained by applying the liquid crystal film composition to a base film, causing the liquid crystal molecules in the composition to alignment in a nematic alignment, and curing the composition. The alignment of the liquid crystal molecules in the film is preferably a nematic hybrid or nematic hemeotropic (vertical) alignment.

16 Claims, 1 Drawing Sheet

DIAGRAM SHOWING TYPICAL CHANGES IN THE RETARDATION VALUES WITH RESPECT TO THE MEASUREMENT ANGLE

COMPOSITION FOR FORMING LIQUID CRYSTAL FILM, OPTICALLY ANISOTROPIC FILM, AND PRODUCTION METHOD THEREOF

TECHNICAL FIELD

The present invention relates to a composition for forming a liquid crystal film, an optically anisotropic film, a production method thereof, and a liquid crystal display.

BACKGROUND ART

Optically anisotropic films are widely used either by themselves or in conjunction with other films as a phase difference film, viewing angle-compensating film, color-compensating film, or elliptical polarization film. For example, an optically anisotropic film has been widely used as a viewing angle-compensating film for widening a viewing angle of a liquid crystal display, where the optically anisotropic film comprises a support film and a liquid crystal film of a rod-shaped nematic liquid crystal compound deposited on the support film in a nematic hybrid alignment. As used herein, the term "nematic hybrid alignment" refers to an arrangement of liquid crystal molecules in which nematic liquid crystal molecules are nematically aligned and the angle that the director of the nematic liquid crystal molecules makes with the film surface gradually increases from the lower surface to the upper surface (toward the interface with air).

Liquid crystal films with such a nematic hybrid alignment can be fabricated in the following manner: An optically alignment film is deposited on a vertically aligned base and a rod-shaped polymerizable homeotropic nematic liquid crystal compound is applied over the optically alignment film. Heat is then applied to cause the liquid crystal molecules to align in the nematic hybrid alignment. Subsequently, the film is exposed to light to cure the photopolymerizable nematic liquid crystal composition and, thus, fix the nematic hybrid alignment (Patent Documents 1, 2, and 3). Such liquid crystal films can also be fabricated in the following manner: A solution of a nematic liquid crystal material of a certain structure is applied onto a support with no alignment film deposited on it. The coated support is heat-dried to cause the liquid crystal molecules to align in the nematic hybrid alignment. Alternatively, the support may further be heated after the first heat-drying to cause the liquid crystal molecules to align in the nematic hybrid alignment. The resulting film is exposed to light to cure the photopolymerizable nematic liquid crystal composition and, thus, fix the nematic hybrid alignment (Patent Document 4).

Patent Document 1: Japanese Patent Application Laid-Open No. 2002-214610
Patent Document 2: Japanese Patent Application Laid-Open No. 2000-98134
Patent Document 3: Japanese Patent Application Laid-Open No. 2003-251643
Patent Document 4: Japanese Patent Application Laid-Open No. 2001-55573

DISCLOSURE OF THE INVENTION

Problems to be Solved by the Invention

However, the technique of Patent Document 1 requires relatively expensive special alignment film to provide a relatively large pre-tilt angle of liquid crystals on the surface of the base and thus achieve nematic hybrid alignment. There are problems that not only this causes material costs to increase, but the technique also involves complex process of forming alignment film. In addition, a simple technique is needed that can achieve that can achieve horizontal alignment, hybrid alignment, or homeotropic (vertical) alignment depending on the desired purpose, even if the same liquid crystal composition are used.

The present invention addresses the above-described problems of prior art and, accordingly, it is an object of the invention to provide a simple way to introduce hybrid alignment or homeotropic (vertical) alignment into liquid crystal films, which, by their nature, tend to have horizontal alignment of liquid crystal molecules, without using a special alignment film.

Means to Solve the Problems

The present inventors have discovered that liquid crystal films with hybrid alignment can be obtained, without using a special alignment film, from a particular liquid crystal composition obtained by adding a hydrolysate of alkoxysilane compound to a polymerizable liquid crystal compound. The present inventors have also discovered that by adjusting the amount of the hydrolysate and the degree of hydrolysis of the alkoxysilane compound, homeotropic alignment, horizontal alignment, and hybrid alignment can be individually achieved. It is these discoveries that led to the present invention.

Accordingly, the present invention provides a liquid crystal composition for forming an optically anisotropic film. The composition contains a polymerizable liquid crystal compound and a hydrolysate of an alkoxysilane compound. The present invention also provides a method for producing the composition for forming a liquid crystal film. Either the method comprises hydrolyzing an alkoxysilane compound to obtain a hydrolysate, and uniformly mixing the hydrolysate with a polymerizable liquid crystal compound, or the method comprises uniformly mixing the alkoxysilane compound with the polymerizable liquid crystal compound, and hydrolyzing the alkoxysilane compound in the mixture.

The present invention further provides an optically anisotropic film that comprises a base film and a liquid crystal film obtained by applying the above-described composition for forming a liquid crystal film on the base film and then curing the composition. The alignment of the liquid crystal molecules in the liquid crystal film is fixed in a nematic alignment. The present invention further provides a method for producing the optically anisotropic film, the method comprising applying the above-described composition for forming a liquid crystal film on the base film; causing the polymerizable liquid crystal compound to align in a nematic alignment; and while maintaining the alignment, curing the polymerizable liquid crystal compound to form a liquid crystal film. Also provided is a method for producing the optically anisotropic film, the method comprising applying the above-described composition for forming a liquid crystal film on a peelable film; causing the polymerizable liquid crystal compound to align in a nematic alignment; while maintaining the alignment, curing the polymerizable liquid crystal compound to form a liquid crystal film; and transferring the liquid crystal film onto a base film using a tackifier or an adhesive.

Furthermore, the present invention provides a liquid crystal display having a liquid crystal panel and the above-described optically anisotropic film applied on at least one surface of the liquid crystal panel.

Advantages of the Invention

The composition of the present invention for forming a liquid crystal film, which comprises a polymerizable liquid crystal compound and a hydrolysate of an alkoxysilane compound, can achieve a hybrid liquid crystal alignment of liquid crystal molecules on an ordinary used base for liquid crystal deposition without using a special alignment film. By adjusting the amount of the hydrolysate and the degree of hydrolysis of the alkoxysilane compound in the composition, not only the hybrid alignment, but a homeotropic (vertical) alignment or a horizontal alignment can also be achieved. The resulting optically anisotropic films are suitable for use, for example, as phase difference film, viewing angle-increasing film, and color-compensating film.

INDICATION OF REFERENCE NUMERALS

1. Liquid crystal display
2. Optically anisotropic film (viewing angle-compensating film)
3. Phase difference panel 3
4. Polarizer
5. Back light
6. Hard coat layer

BEST MODE FOR CARRYING OUT THE INVENTION

The composition of the present invention for forming a liquid crystal film contains a polymerizable liquid crystal compound and a hydrolysate of an alkoxysilane compound.

The alkoxysilane compound may be a silane compound having 2 or 3 alkoxy groups, preferably 3 alkoxy groups, for example methoxy groups or ethoxy groups that have affinity for inorganic surfaces. Commercially available silane coupling agents can preferably be used. As used herein, the term "silane coupling agent" refers to a compound being composed of an organic material and silicon and including in its molecule two types of substituents with different reactivities that are functional groups having affinity or reactivity for inorganic materials.

Examples of such functional groups include vinyl group, epoxy group, (meth)acryloxy group, mercapto group, and halogen atoms. Vinyl group may be directly bound to silicon atom or it may be bound to silicon atom via a phenylene or alkylene group. Epoxy group, (meth)acryloxy group, mercapto group, and halogen atoms may be bound to silicon atom, for example, via an alkyl group.

Specific examples of the alkoxysilane compound for use in the present invention include vinyltrimethoxysilane, vinyltriethoxysilane, 3-glycidoxypropyltrimethoxysilane, 3-glycidoxypropylmethyldiethoxysilane, 3-glycidoxypropyltriethoxysilane, 2-(3,4-epoxycyclohexyl)ethyltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, 3-acryloxypropylmethyldimethoxysilane, 3-chloropropyltrimethoxysilane, 3-mercaptopropylmethyldimethoxysilane, and 3-mercaptopropyltriethoxysilane.

The hydrolysate of the alkoxysilane compound is used in the present invention because hybrid alignment and homeotropic (vertical) alignment can be achieved only by the use of the hydrolysate. The major component of the hydrolysate of the alkoxysilane compound is a siloxane oligomer with a degree of polymerization of 2 to 25, preferably 5 to 15.

If excess water is used to hydrolyze the alkoxysilane compound, water separates from the hydrolysate and the resulting liquid crystal film may not become uniform. Conversely, if too little water is used to hydrolyze the alkoxysilane compound, the desired hybrid alignment or homeotropic (vertical) alignment cannot be achieved in the liquid crystal film. Thus, the hydrolysate of the present invention is preferably obtained by hydrolyzing one mole of the alkoxysilane compound with 0.1 d to 2.0 d mol, preferably 0.8 d to 1.5 d mol, of water, given that the number of alkoxyl groups in a molecule of the alkoxysilane compound is d, specifically 2 or 3.

The polymerizable liquid crystal compound for use in the present invention is preferably a known discotic polymerizable liquid crystal compound or a known rod-shaped smectic polymerizable liquid crystal compound that can align in a homeotropic alignment and has a polymerizable group such as (meth)acryloyl group (collective term for acryloyl group and methacryloyl group, and cinnamoyl group. Among such polymerizable liquid crystal compounds are photocurable polymerizable liquid crystal compounds comprising biphenyl derivatives, phenylbenzoate derivatives, stilbene derivatives, triphenylene derivatives or truxene derivatives that contain in their molecular structure a group that enables homeotropic alignment of these compounds (e.g., aromatic groups having bulky substituents at the ends, long chain alkyl groups, or fluorine atoms). Particularly preferred polymerizable liquid crystal compounds are mixtures containing the compound described in Patent Document 4 (Japanese Patent Application Laid-Open No. 2001-55573, see paragraphs 0004 through 0007) and represented by any of the following general formula (1) and (2) or the compound described in Patent Document 2 (Japanese Patent Application Laid-Open No. 2000-98134, see paragraphs 0049 through 0050) and represented by any of the following general formulas (3) through (9). Polymerizable liquid crystal compounds that comprise at least two compounds, at least one of which is represented by any of the formula (1) through (9) are particularly preferred. The compounds of general formula (2) are rod-shaped smectic polymerizable liquid crystal compounds that by themselves can align in a homeotropic alignment. In contrast, the compounds shown by the general formula (1) generally do compounds shown by the general formula (1) generally do not behave as liquid crystals by themselves, but do so when used as mixtures with the compounds of the general formula (2).

(1)

(2)

In the formulas (1) and (2), $R^1$, $R^2$ and $R^3$ are each individually hydrogen or methyl; X is one selected from the group consisting of hydrogen, chlorine, bromine, iodine, and alkyl having 1 to 4 carbon atoms, methoxy, cyano, and nitro groups; and a, b, and c are each individually an integer of 2 to 12.

(3)

(4)

(5)

(6)

(7)

(8) (9)

In the general formulas (3) through (9), F is 1,4-phenylene or 1,4-cyclohexylene; $R^0$ is halogen, cyano group, or alkyl or alkoxy group having 1 to 12 carbon atoms which may or may not be halogenated and may or may not be substituted with a polymerizable terminal group; $L^1$ and $L^2$ are each individually hydrogen atom, fluorine atom, chlorine atom or cyano group, or halogenated or non-halogenated alkyl, alkoxyl or alkanoyl group having 1 to 7 carbon atoms; and x and y are each individually an integer of 1 to 12.

Specific examples of the compounds of the formulas (1) through (9) are compounds described in Patent Document 3 (Japanese Patent Application Laid-Open No. 2003-251643, see paragraphs 0074 through 0076) and represented by the following formulas (10) through (13):

zoyl-4'-methyldiphenylsulfide, benzil methyl ketal, dimethylaminomethyl benzoate, 2-n-butoxyethyl-4-dimethylaminobenzoate, isoamyl p-dimethylaminobenzoate, 3,3'-dimethyl-4-methoxybenzophenone, methyl benzoylformate, 2-methyl-1-(4-(methylthio)phenyl)-2-morpholinopropane-1-one, 2-benzyl-2-dimethylamino-1-(4-morpholinophenyl)-butane-1-one, 1-(4-dodecylphenyl)-2-hydroxy-2-methylpropane-1-one, 1-hydroxycyclohexyl phenyl ketone, 2-hydroxy-2-methyl-1-phenylpropane-1-one, 1-(4-isopropylphenyl)-2-hydroxy-2-methylpropane-1-one, 2-chiorothioxanthone, 2,4-diethylthioxanthone, 2,4-diisopropylthioxanthone, 2,4-dimethylthioxanthone, isopropylthioxanthone, and 1-chloro-4-propoxythioxanthone.

The content of the hydrolysate of the alkoxysilane compound in the liquid crystal film composition of the present invention is in the range of preferably 0.1 to 40 wt %, and more preferably 0.5 to 30 wt % of the composition. Too small an amount of the hydrolysate cannot produce the desired effect whereas too large an amount results in a reduced ability of the composition to form film.

A non-liquid crystal polymerizable compound that can copolymerize with the polymerizable liquid crystal compound may be added to the liquid crystal film composition of the present invention in amounts that do not affect the advantage of the present invention, specifically 40 wt % or less, preferably 30 wt % or less, and more preferably 20 wt % or less. Such a polymerizable compound may be a photopolymerizable compound or composition, or another photopolymerizable compound having acryl groups or methacrylate groups, where the former photopolymerizable compound includes polyester(meth)acrylates obtained by reacting a (meth)acrylic acid with a polyester prepolymer of a polyol with a monobasic acid or polybasic acid; polyurethane(meth)acrylates obtained by reacting a compound with a polyol group and two isocyanate groups and then reacting a (meth)acrylic acid; and epoxy(meth)acrylates obtained by reacting a (meth)acrylic acid with an epoxy resin, such as bisphenol A-type epoxy resin, bisphenol F-type epoxy resin, novolac-type epoxy resin, polycarboxylic acid polyglycidyl ester, polyol polyglycidyl ether, fatty acid or alicyclic epoxy resin, amine epoxy resin, triphenolmethane-type epoxy resin, and dihydroxybenzene-type epoxy resin.

When necessary, a photoreaction initiator may be added to the liquid crystal film composition of the present invention. Examples of the photoreaction initiator include, but are not limited to, benzil (also known as bibenzoyl), benzoyl ether, benzoyl isobutyl ether, benzoyl isopropyl ether, benzophenone, benzoylbenzoic acid, methyl benzoylbenzoate, 4-ben- The addition amount of the photoreaction initiator is in the range of typically 0.01 to 20 parts by weight, preferably 0.1 to 10 parts by weight, and more preferably 0.5 to 5 parts by weight relative to 100 parts by weight of the polymerizable liquid crystal compound.

A sensitizer may be added to the liquid crystal film composition of the present invention in amounts that do not affect the advantage of the present invention.

If necessary, an organic solvent may be added to the liquid crystal film composition of the present invention to facilitate film formation. Examples of such organic solvents include hydrocarbons such as cyclohexane, cyclopentane, benzene, toluene, xylene, n-butylbenzene, diethylbenzene, and tetralin; ethers such as methoxybenzene, 1,2-dimethoxybenzene, and diethylene glycol dimethyl ether; ketones such as acetone, methyl ethyl ketone, methyl isobutyl ketone, cyclohexanone, cyclopentanone, and 2,4-pentanedione; esters such as ethyl acetate, ethylene glycol monomethyl ether acetate, propylene glycol monomethyl ether acetate, propylene glycol monoethyl ether acetate, and γ-butyrolactone; amide-based solvents such as 2-pyrrolidone, N-methyl-2-pyrrolidone, dimethylformamide, and dimethylacetamide; halogen-based solvents such as chloroform, dichloromethane, carbon tetrachloride, dichloroethane, tetrachloroethane, trichloroethylene, tetrachloroethylene, chlorobenzene, and orthodichlorobenzene; alcohols such as t-butyl alcohol, diacetone alcohol, glycerol, monoacetin, ethylene glycol, triethylene glycol, hexylene glycol, ethylene glycol monomethyl ether, ethyl cellosolve, and butyl cellosolve; and phenols such as phenol and parachlorophenol. Suitable solvents are chosen from the above-described solvents based on, for example, the solvent-resistance of the base film. These solvents may be used either individually or as a mixture of two or more solvents. The amount of the organic solvent used in the liquid crystal film composition of the present invention is typically 1 to 60 wt %, and preferably 3 to 40 wt %, while the amount may vary depending on the solubility of the polymerizable liquid crystal compound and the thickness of the liquid crystal film.

Furthermore, a surfactant and the like may be added to the liquid crystal film composition of the present invention to improve coatability of the composition. The surfactant is added in amounts that do not affect the advantage of the invention. Examples of the surfactants include cationic surfactants such as imidazoline, quaternary ammonium salts, alkylamine oxides, and polyamine derivatives; anionic surfactants such as condensates of polyoxyethylene-polyoxypropylene, primary or secondary alcohol ethoxylates, alkylphenol ethoxylates, polyethylene glycol and esters thereof, sodium lauryl sulfate, ammonium lauryl sulfate, amine lauryl sulfates, alkyl-substituted aromatic sulfonates, alkyl phosphates, and condensates of aliphatic or aromatic sulfonic acids with formalin; amphoteric surfactants such as lauryl amide propyl betaine and lauryl amino betaine acetate; nonionic surfactants such as polyethylene glycol fatty acid esters and polyoxyethylene alkyl amines; and fluorine-based surfactants such as perfluoroalkyl sulfonates, perfluoroalkyl carbonates, perfluoroalkyl ethylene oxide adducts, perfluoroalkyl trimethyl ammonium salts, perfluoroalkyl group- and hydrophilic group-containing oligomers, perfluoroalkyl group- and lipophilic group-containing oligomers and perfluoroalkyl group-containing urethanes.

The addition amount of the surfactant is in the range of typically 10 ppm to 10%, preferably 100 ppm to 5%, and more preferably 0.1% to 1% relative to the polymerizable liquid crystal compound (by weight) while the amount may vary depending on the type of the surfactant, the composition of the liquid crystal film composition, the type of the solvent, and the type of the base film and the like.

The liquid crystal film composition of the present invention can be produced either by hydrolyzing the alkoxysilane compound to obtain a hydrolysate thereof and uniformly mixing the resulting hydrolysate with the polymerizable liquid crystal compound, or by uniformly mixing the alkoxysilane compound with the polymerizable liquid crystal compound first and then hydrolyzing the alkoxysilane compound in the mixture. As described above, 0.1 d to 2.0 d mol, preferably 0.8 d to 1.5 d mol of water is used to hydrolyze one mole of the alkoxysilane compound, given that the number of alkoxyl groups in a molecule of the alkoxysilane compound is d.

It is preferred that the water used to hydrolyze the alkoxysilane compound contain small amounts of acid, for example, approximately 0.01 to 2% of acetic acid, to increase the rate of hydrolysis. The hydrolysis is preferably carried out at 30 to 80° C. Too low a temperature impractically slows hydrolysis whereas too high a temperature causes evaporation of water. Hydrolysis is typically carried out over a time period of 0.5 to 24 hours.

As described above, the liquid crystal film composition of the present invention thus obtained is applied to the base film and cured to form a liquid crystal film. The resulting laminate of the base film/liquid crystal film serves as an optically anisotropic film in which the liquid crystal molecules are aligned in a fixed alignment of nematic horizontal alignment, preferably nematic hybrid alignment or nematic homeotropic (vertical) alignment. The film can be fabricated to have either nematic hybrid alignment, nematic homeotropic (vertical) alignment, or nematic horizontal alignment by adjusting the amount of the hydrolysate and the degree of hydrolysis of the alkoxysilane compound and choosing a proper material for the base film. For example, the film tends to have hybrid or homeotropic (vertical) alignment, rather than horizontal alignment, at increased amounts of the hydrolysate of the alkoxysilane compound and tends to have hybrid or homeotropic (vertical) alignment, rather than horizontal alignment, at high degrees of hydrolysis. Also, the film tends to have homeotropic (vertical) alignment, rather than horizontal alignment, when the base film is made of saponified triacetylcellulose film, hard coated (e.g., acrylic resin-coated) triacetylcellulose film, or glass substrate.

To protect the surface of the optically anisotropic film, an optically isotropic layer of a curable acrylic resin or curable epoxy resin may be deposited or an optically isotropic protective film may be applied on the optically anisotropic film.

The base film may be any film on which the liquid crystal film composition can be applied to form a coating film. Examples include plastic films made of such materials as polyimide, polyamide imide, polyamide, polyether imide, polyether ether ketone, polyether ketone, polyketone sulfide, polyether sulfone, norbornene copolymer resins (e.g., ARTON film, JSR), cycloolefin polymers (e.g., ZEONEX film, Nippon Zeon), polysulfone, polyphenylene sulfide, polyphenylene oxide, polyethylene terephthalate, polybutylene terephthalate, polyethylene naphthalate, polyacetal, polycarbonate, polyallylate, acrylic resin, fully saponified polyvinyl alcohol, partially saponified polyvinyl alcohol, polypropylene, cellulose, non-saponified triacetyl cellulose (which may be referred to as "TAC," hereinafter), completely or partially saponified epoxy resin, and phenol resin. These plastic films may be a uniaxially stretched film or biaxially stretched film. Also, the surface of these plastic films may be processed to impart hydrophilicity or hydrophobicity. The plastic films may be laminated films. Alternative materials to the plastic films may also be used, including metal substrates made of aluminum, iron, or copper with slit-like grooves formed on them, and glass substrates made of alkaline glass, borosilicate glass, or flint glass with slit-like patterns etched on them. These metal substrates and glass substrates are also included by the substrates for use in the present invention.

When it is desired to align the polymerizable liquid crystal compound in a horizontal or hybrid alignment, it is preferred to rub the surface of the base film. Either the base film may be directly rubbed, or an alignment film deposited on the base film may be rubbed. The alignment film deposited for this purpose may be made of materials such as polyimide, polyamide, or polyvinyl alcohol. While the rubbing process may be done by any known rubbing technique, one typical technique involves rubbing the base film or the alignment film against a piece of rayon, cotton, or polyamide cloth wrapped around a rotating and moving metal roll. Alternatively, the base film may be moved and rubbed against a fixed roll. For certain types of base film, a silicon oxide film may be obliquely deposited on the surface to serve as the alignment film.

On the other hand, aligning the polymerizable liquid crystal compound in a uniform homeotropic (vertical) alignment can be achieved whether the base film is rubbed or not.

Basically, the optically anisotropic film of the present invention can be manufactured as follows: The above-described liquid crystal film composition is first applied to the base film. The molecules of the polymerized liquid crystal compound in the coating are then aligned, preferably in a nematic hybrid alignment or a nematic homeotropic (vertical) alignment. While the molecules are kept aligned, the coating is cured to form a liquid crystal film. This process for producing the optically anisotropic film of the present invention will now be described in further detail.

First, the liquid crystal film composition is applied to the base surface. This can be done by known coating techniques such as spin coating, roll coating, printing, dipping, and curtain coating (die coating).

The coating of the liquid crystal film composition is then dried by a common technique. During this step, the molecules of the polymerizable liquid crystal compound in the coating are aligned in a nematic alignment. The drying step can be done in any manner: Suitable conditions for removing the organic solvent while preventing flowing off of the coating are selected. For example, the solvent can be removed by air-drying at room temperature, drying by hot plate or furnace, or blowing warm or hot air stream.

The coating of the liquid crystal film composition in which the liquid crystal molecules are aligned in the nematic alignment is then cured to fix the alignment of the liquid crystal molecules and thus form the liquid crystal film. This completes the optically anisotropic film comprising the liquid crystal film deposited on the base film.

The curing step of the coating of the nematically aligned liquid crystal film composition can be done by exposing the coating to electromagnetic radiation. The electromagnetic radiation for use in the curing step may be of any wavelength, including electron beam, ultraviolet rays, visible light, and infrared rays (heat rays). The energy, temperature, atmosphere, and time of irradiation may be properly determined, for example, depending on the components of the liquid crystal film composition.

An alternative process for producing the optically anisotropic film by depositing the liquid crystal film on the base film is carried out as follows: The liquid crystal film composition is applied to a peelable film and the molecules of the polymerizable liquid crystal compound are aligned in a nematic alignment. While the molecules are kept aligned, the coating is cured to form the liquid crystal film, which in turn is transferred to the base film using a tackifier or an adhesive. The tackifier is preferably optically isotropic and is preferably an acrylic tackifier, silicone-based tackifier, polyvinyl acetate-based tackifier, or ethylene-vinyl acetate-based tackifier. Of these, acrylic tackfiers are particularly preferred. The adhesive is preferably optically isotropic and is preferably a thermosetting adhesive, photocurable adhesive, or electron beam-curable adhesive. Of these, photocurable adhesives and electron beam-curable adhesives containing acryl monomers or oligomers as major components are particularly preferred, as are epoxy resin-based photocurable adhesives and electron beam-curable adhesives.

Figure 1:
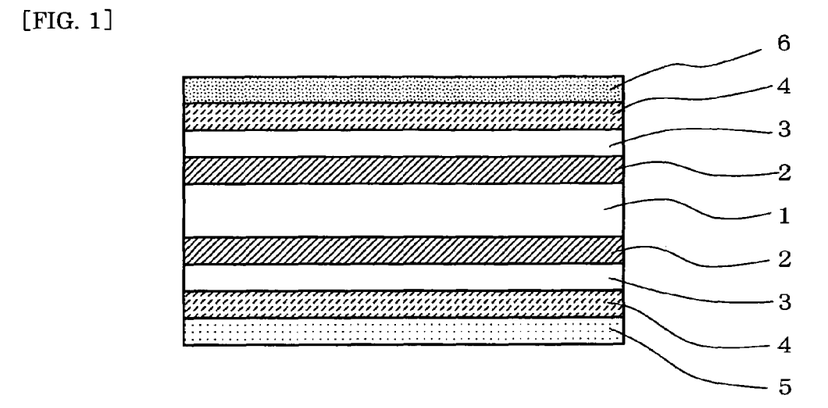
FIG. 1 is a schematic cross-section of a liquid crystal display.

The optically anisotropic film of the present invention finds applications in a wide range of optic fields. In particular, the optically anisotropic film in which the liquid crystal molecules are aligned and fixed in a nematic hybrid alignment can be used in twisted nematic-type liquid crystal displays (referred to as "TN-LCD," hereinafter) as the viewing angle-compensating film. This type of film is also preferably used in various LCDs in conjunction with a polarizer to serve as an elliptical polarizer. For example, liquid crystal displays that offer an increased viewing angle can be constructed by arranging the optically anisotropic film of the present invention on at least one side of known liquid crystal panels. An exemplary construction of such a liquid crystal display is shown in FIG. 1 as reference. The liquid crystal display comprises a conventional liquid crystal panel 1; optically anisotropic films 2 of the present invention arranged on either side of the liquid crystal panel 1 and serving as viewing angle-compensating film; conventional phase difference panels 3; and polarizers 4. A conventional backlight 5 is arranged on the back side of the liquid crystal panel 1 and a conventional hard coat layer is deposited on the front side of the liquid crystal display panel 1.

The present invention will now be described with reference to examples.

EXAMPLE 1

Effect of the Addition Amount of Hydrolysate of Trialkoxysilane Compound (Preparation of Base Film)

One of the base films shown in Table 1 was applied to a glass support and the base film was rubbed on the surface with a piece of rayon cloth (R-20, Yoshikawa Chemical) in one direction.

The polyvinyl alcohol (PVA) alignment film used in this and the other examples was prepared by applying a 5% aqueous solution of powdered PVA to the base film and drying the solution at 90° C. for 10 min to a dry thickness of 0.1 to 0.8 µm. The polyimide (PI) alignment film used was prepared by applying a 5% polyimide solution to the glass substrate and drying the solution at 200° C. for 1 hour to a dry thickness of 0.1 to 0.8 µm.

(Preparation of Hydrolysate of Silane Coupling Agent)

To 1 mol of an acryloxy group-containing trimethoxysilane-based coupling agent (3-acryloxypropyltrimethoxysilane) (KBM-5103, Shin-Etsu Chemical), 4.5 mol of water (with 1 wt % acetic acid) was added and the mixture was stirred at 60° C. for 2 hours to give a hydrolysate of the silane coupling agent as a clear solution. A gel permeation chromatography of the solution revealed that it contained 98% polysilanol oligomer with a degree of polymerization of 2 to 25 (i.e., 2 to 25 mers) and 2% monomer.

(Preparation of Liquid Crystal Film Composition)

100 parts by weight of a nematic polymerizable liquid crystal compound (RMM34, Merck Germany) (containing 20 wt % of 4-cyanophenyl ester of 4-(6-acryloyloxyhexyloxy)benzoic acid (Compound of the formula (13))), 5 parts by weight of a photopolymerization initiator (2-methyl-1-(4-(methylthiophenyl)-2-morpholinopropane)-1-one) (Irgacure 907, Ciba Specialty Chemicals), and 200 parts by weight of propyleneglycol monomethyl ether acetate were mixed together. To this mixture, the hydrolysate of the silane coupling agent was added in a proportion shown in Table 1 to give a liquid crystal film composition.

(Preparation of Optically Anisotropic Film)

The liquid crystal film composition was applied to the rubbed surface of the base film by spin-coating (100 RPM for 10 sec followed by 680 RPM for 30 sec) and the coating was dried in a drier at 55° C. for 10 min. Using a high-pressure mercury lamp at room temperature, the resulting film of the liquid crystal film composition was exposed to 365 nm ultraviolet rays at a luminance of 80 mW/cm$^2$ and at a dose of 1000 mJ/cm$^2$ to cure the composition and, thus, give an optically anisotropic film.

Evaluation

The liquid crystal alignment of the resulting optically anisotropic film was evaluated by a visual inspection measurement and a phase difference measurement. Techniques used to determine if the liquid crystal molecules are aligned in the vertical (homeotropic) alignment, hybrid alignment, or horizontal (homogenous) alignment are described below.

Confirmation of Homeotropic (Vertical) Alignment (Visual Inspection Measurement)

A liquid crystal film sample with vertical alignment is sandwiched between two polarizers arranged in a cross-nicol configuration so that the film sample makes an angle of 45° with the optical axes of the polarizers. The film sample is observed at perpendicular and oblique angles with respect to the surface of the film sample. When the liquid crystal film sample is observed at a perpendicular angle, there is no delay (no retardation) in the phase of the film sample and, thus, the film sample transmits no light. In contrast, when the film sample is observed at a right or left oblique angle or at an upward or downward oblique angle, a delay occurs in the phase of the liquid crystal film in the right and left or upward or downward symmetrical fashion, and the amount of transmitted light is observed in the right and left or upward or downward symmetrical fashion.

(Phase Difference Measurement)

When a liquid crystal film with vertical alignment is analyzed by optical instrument RETS-1100 (Otsuka Electronics) from varying angles, the retardation (phase difference) of the liquid crystal film is near 0 nm (at 550 nm) when the angle of the measurement light is perpendicular. The retardation increases right and left symmetrically as the angle of the measurement light deviates from the perpendicular direction (See FIG. 2, typical variation of retardation with respect to the measurement angle).

(Confirmation of Hybrid Alignment)

(Visual Inspection Measurement)

A liquid film sample with hybrid alignment is sandwiched between two polarizers arranged in a cross-nicol configuration so that the film makes an angle of 45° with the optical axes of the polarizers. The film is observed from varying angles, beginning at the perpendicular angle and shifting to a right or left oblique angle. The retardation varies right and left asymmetrically and the film transmits light in right and left asymmetrical fashion.

(Phase Difference Measurement)

Figure 2:
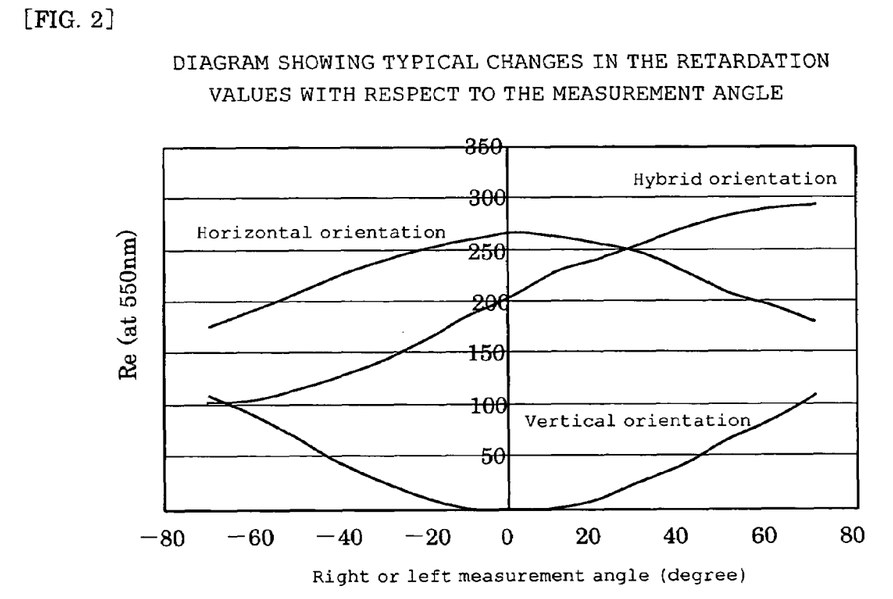
FIG. 2 is a diagram showing typical changes in the retardation values with respect to the measurement angle.

When a liquid crystal film with hybrid alignment is analyzed by optical instrument RETS-1100 (Otsuka Electronics) from varying angles, the retardation (phase difference) of the liquid crystal film changes in a right and left asymmetrical manner (See FIG. 2, typical variation of retardation with respect to the measurement angle).

(Confirmation of Horizontal Alignment)

(Visual Inspection Measurement)

A liquid film sample with homogenous alignment is sandwiched between two polarizers arranged in a cross-nicol configuration so that the film makes an angle of 45° with the optical axes of the polarizers. The film sample is observed at perpendicular and oblique angles with respect to the surface of the film sample. When the liquid crystal film sample is observed at a perpendicular angle, a delay occurs in the phase of the film sample and, thus, the film sample transmits light. In contrast, when the film sample is observed at a right or left oblique angle, the retardation in the phase of the liquid crystal film decreases in a right and left symmetrical fashion and, thus, a right and left symmetrical change (decrease) is observed in the amount of transmitted light.

(Phase Difference Measurement)

When a liquid crystal film with homogenous alignment is analyzed by optical instrument RETS-1100 (Otsuka Electronics) from varying angles, the retardation (phase difference) of the liquid crystal film decreases, in a right and left symmetrical manner, from the maximum value observed when the measurement light is in the perpendicular direction (See FIG. 2, typical variation of retardation with respect to the measurement angle).

TABLE 1

| Base film or alignment film | | Proportion (wt %) of hydrolysate of trimethoxysilane-based coupling agent | | | | | | | |
|---|---|---|---|---|---|---|---|---|---|
| | | 0 | 1 | 2.5 | 5 | 8 | 10 | 20 | 30 |
| Non-saponified TAC base film *1 | Alignment of LC | Horizontal | Horizontal | Hybrid | Hybrid | Hybrid + Vertical | Vertical | Vertical | Vertical |
| | Appearance | Uniform | Somewhat speckled | Nonuniform | Uniform | Nonuniform | Uniform | Uniform | Uniform |
| Saponified TAC base film *2 | Alignment of LC | Horizontal | Horizontal | Vertical | Vertical | Vertical | Vertical | Vertical | Vertical |
| | Appearance | Uniform | Uniform | Uniform | Uniform | Uniform | Uniform | Uniform | Uniform |
| Glass substrate *3 | Alignment of LC | Horizontal | Vertical | Vertical | Vertical | Vertical | Vertical | Vertical | Vertical |
| | Appearance | Uniform | Uniform | Uniform | Uniform | Uniform | Uniform | Uniform | Uniform |
| HC-applied TAC base film *4 | Alignment of LC | Horizontal + uneven | Vertical | Vertical | Vertical | Vertical | Vertical | Vertical | Vertical |
| | Appearance | Nonuniform | Uniform | Uniform | Uniform | Uniform | Uniform | Uniform | Uniform |
| Fully saponified PVA alignment film *5 | Alignment of LC | Horizontal | Horizontal | Hybrid | Hybrid | Vertical | Vertical | Vertical | Vertical |
| | Appearance | Uniform | Uniform | Uniform | Uniform | Uniform | Uniform | Uniform | Uniform |
| Partially saponified PVA alignment film *6 | Alignment of LC | Horizontal | Horizontal | Vertical | Vertical | Vertical | Vertical | Vertical | Vertical |
| | Appearance | Uniform | Uniform | Uniform | Uniform | Uniform | Uniform | Uniform | Uniform |
| Carboxylic acid-modified PVA alignment film *7 | Alignment of LC | Horizontal | Horizontal | Hybrid | Hybrid + Vertical | Vertical | Vertical | Vertical | Vertical |
| | Appearance | Uniform | Uniform | Uniform | Nonuniform | Uniform | Uniform | Uniform | Uniform |
| Polyimide alignment film *8 | Alignment of LC | Horizontal | Horizontal | Hybrid | Hybrid | Hybrid | Hybrid | Hybrid | Hybrid |
| | Appearance | Uniform | Uniform | Uniform | Uniform | Uniform | Uniform | Uniform | Uniform |

TABLE 1-continued

| Base film or alignment film | | Proportion (wt %) of hydrolysate of trimethoxysilane-based coupling agent | | | | | | | |
|---|---|---|---|---|---|---|---|---|---|
| | | 0 | 1 | 2.5 | 5 | 8 | 10 | 20 | 30 |
| Polyimide alignment film *9 | Alignment of LC | Hybrid | Hybrid | Hybrid | Hybrid | Hybrid | Hybrid | Hybrid | Hybrid |
| | Appearance | Uniform | Uniform | Uniform | Uniform | Uniform | Uniform | Uniform | Uniform |

Table 1 Note
*1: T80UZ, Fuji Film, No alignment film.
*2: TAC film obtained by saponifying T80UZ (Fuji Film) (Saponification condition: T80UZ was immersed in an aqueous 2N KOH solution at 60° C. for 5 min, followed by neutralization with an aqueous 0.5N HCl solution and thenwashing with distilled water.), No alignment film.
*3: Slide glass, Matsunami Glass Industry, No alignment film.
*4: KTAC80-HC, Nihon Seishi, No alignment film, Hard coat (HC).
*5: TAC base film (T80UZ, Fuji Film, No alignment film) PVA alignment film (NH-18, Nippon Synthetic Chemical Industry, Saponification rate: 99%)
*6: TAC base film (T80UZ, Fuji Film, No alignment film) PVA alignment film (GM-14, Nippon Synthetic Chemical Industry, Saponification rate: 88%)
*7: TAC base film (T80UZ, Fuji Film, No alignment film) PVA alignment film (T-330H, Nippon Synthetic Chemical Industry, Saponification rate: 99%)
*8: Glass substrate (slide glass, Matsunami Glass Industry)
Polyimide (PI) alignment film (AL-1054 PI Optomer, JSR; drying condition; 5 wt % polyamic acid solution, SC(PCT)-87US drying condition; 80° C. for 10 min then 200° C. for 60 min.)
*9: Glass substrate (slide glass, Matsunami Glass Industry)

Polyimide (PI) alignment film (PIA-5580-01A, Chisso; drying condition; 5 wt % polyamic acid solution, drying condition; 80° C. for 30 min, followed by 200° C. for 60 min, followed by 250° C. for 30 min.)

As can be seen from Table 1, liquid crystal molecules are aligned in a hybrid alignment without using the hydrolysate of the alkoxysilane compound when a conventional hybrid alignment film (polyimide alignment film 9) is used. In comparison, when the other alignment films are used or no alignment film is used, liquid crystal molecules are aligned in a horizontal alignment but not in a hybrid or homeotropic (vertical) alignment in the absence of the hydrolysate of the alkoxysilane compound. The presence of the hydrolysate of the alkoxysilane compound allows the liquid crystal molecules in the liquid crystal film of the optically anisotropic film to align in a hybrid alignment or a vertical alignment even in the absence of alignment films. It also turns out that as the addition amount of the hydrolysate is increased, the liquid crystal molecules are more likely to align in a hybrid or vertical alignment than in a horizontal alignment. It has been shown that the alignment of liquid crystal molecules can be controlled by changing materials for the base film or the alignment film.

With regard to the alignment of liquid crystal molecules shown in Table 1, "hybrid+vertical" indicates that domains of hybrid alignment exist with domains of homeotropic (vertical) alignment.

EXAMPLE 2

Effect of the Degree of Hydrolysis of Trialkoxysilane Compound

Optical anisotropic films were prepared in the same manner as in Example 1, except that water (with 1 wt % acetic acid) was added to 1 mol of an acryloxy group-containing trimethoxysilane-based coupling agent (3-acryloxypropyltrimethoxysilane, KBM-5103, Shin-Etsu Chemical) in amounts shown in Table 2. The resulting liquid crystal films were evaluated for the alignment of liquid crystal molecules in the liquid crystal film by visual inspection and phase difference measurement. The results are shown in Table 2.

TABLE 2

| Base film or alignment film | | Amount (mol) of water for hydrolysis relative to 1 mol of trimethoxysilane-based coupling agent (Number of alkoxyl group (d) = 3) | | | | |
|---|---|---|---|---|---|---|
| | | 0 (0d) | 1.5 (0.5d) | 2.4 (0.8d) | 3 (1.0d) | 4.5 (1.5d) |
| Non-saponified TAC base film *1 | Alignment of LC | Horizontal | Horizontal | Horizontal + Hybrid | Hybrid | Hybrid |
| | Appearance | Uniform | Uniform | Nonuniform | Uniform | Uniform |
| Saponified TAC base film *2 | Alignment of LC | Horizontal | Flowery pattern | Vertical | Vertical | Vertical |
| | Appearance | Uniform | Nonuniform | Uniform | Uniform | Uniform |
| Glass substrate *3 | Alignment of LC | Horizontal | Flowery pattern | Vertical | Vertical | Vertical |
| | Appearance | Uniform | Nonuniform | Uniform | Uniform | Uniform |
| HC-applied TAC base film *4 | Alignment of LC | Flowery pattern | Flowery pattern | Vertical | Vertical | Vertical |
| | Appearance | Nonuniform | Nonuniform | Uniform | Uniform | Uniform |

TABLE 2-continued

| | | Amount (mol) of water for hydrolysis relative to 1 mol of trimethoxysilane-based coupling agent (Number of alkoxyl group (d) = 3) | | | | |
|---|---|---|---|---|---|---|
| Base film or alignment film | | 0 (0d) | 1.5 (0.5d) | 2.4 (0.8d) | 3 (1.0d) | 4.5 (1.5d) |
| Fully saponified PVA alignment film *5 | Alignment of LC | Horizontal | Horizontal | Hybrid | Vertical | Vertical |
| | Appearance | Uniform | Uniform | Uniform | Uniform | Uniform |
| Partially saponified PVA alignment film *6 | Alignment of LC | Horizontal | Horizontal | Hybrid | Vertical | Hybrid |
| | Appearance | Uniform | Uniform | Uniform | Uniform | Uniform |
| Carboxylic acid-modified PVA alignment film *7 | Alignment of LC | Horizontal | Horizontal + Hybrid | Hybrid | Hybrid + Vertical | Hybrid + Vertical |
| | Appearance | Uniform | Nonuniform | Uniform | Nonuniform | Uniform |
| Polyimide alignment film *8 | Alignment of LC | Horizontal | Hybrid | Hybrid | Hybrid | Hybrid |
| | Appearance | Uniform | Nonuniform | Uniform | Uniform | Uniform |
| Polyimide alignment film *9 | Alignment of LC | Hybrid | Hybrid | Hybrid | Hybrid | Hybrid |
| | Appearance | Uniform | Nonuniform | Uniform | Nonuniform | Uniform |

Table 2 Note:
*1 through *9 are as described in Table 1.

As can be seen from Table 2, liquid crystal molecules are aligned in a hybrid alignment irrespective of the degree of hydrolysis of the alkoxysilane compound when a conventional hybrid alignment film (polyimide alignment film 9) is used. In comparison, when the other alignment films are used or no alignment film is used, and if the alkoxysilane compound is not hydrolyzed, liquid crystal molecules are aligned in a horizontal alignment but not in a hybrid or vertical alignment. The presence of the hydrolysate of the alkoxysilane compound allows the liquid crystal molecules in the liquid crystal film of the optically anisotropic film to align in a hybrid alignment or a vertical alignment even in the absence of alignment films. It has also been shown that the alignment of liquid crystal molecules can be controlled by changing materials for the base film and the alignment film.

EXAMPLE 3
Effect of the Functional Group of Trialkoxysilane Compound

To 1 mol of each of the trimethoxysilane-based coupling agents and the dimethoxysilane-based coupling agents each having a functional group shown in Table 3 (Each manufactured by Shin-Etsu Chemical), 4.5 mol or 3 mol of water (with 1 wt % acetic acid) were added, respectively. The mixture was stirred at 60° C. for 2 hours to give a hydrolysate of the silane coupling agent as a clear solution. Meanwhile, 100 parts by weight of a nematic polymerizable liquid crystal compound (RMM34, Merck Germany) (containing 20 wt % of 4-cyanophenyl ester of 4-(6-acryloyloxyhexyloxy)benzoic acid (Compound of the formula (13))), 5 parts by weight of a photopolymerization initiator (Irgacure 907, Ciba Specialty Chemicals), and 200 parts by weight of propyleneglycol monomethyl ether acetate were mixed together. To this mixture, 5 parts by weight of the hydrolysate of the silane coupling agent were added to give a liquid crystal film composition. As in Example 1, this composition was used to make an optically anisotropic film. The film was evaluated for the alignment of liquid crystal molecules in the liquid crystal film by phase difference technique. The results are shown in Table 3.

TABLE 3

| | Alignment of liquid crystal molecules in liquid crystal film | | | | | | |
|---|---|---|---|---|---|---|---|
| | Functional group of trimethoxysilane-based or dimethoxysilane-based coupling agent | | | | | | |
| Base film or alignment film | KBM-5103 Acryloxy group | KBM-503 Methacryloxy group | KBM-1003 Vinyl group | KBM-803 Mercapto group | KBM-703 Chloropropyl group | KBE-5102 Bifunctional acryloxy group | KBM-403 Epoxy group |
| Non-saponified TAC base film *1 | Hybrid | Horizontal | Hybrid | Horizontal | Horizontal | Horizontal | Horizontal |
| Saponified TAC base film *2 | Vertical alignment | Horizontal | Hybrid | Hybrid | Horizontal | Horizontal | Horizontal |
| Glass substrate *3 | Vertical alignment | Vertical alignment | Vertical alignment | Vertical alignment | Hybrid | Hybrid | Hybrid |
| Fully saponified PVA alignment film *5 | Hybrid | Unconfirmed | Unconfirmed | Unconfirmed | Unconfirmed | Horizontal | Unconfirmed |
| Fully saponified PVA alignment film *10 | Hybrid | Unconfirmed | Unconfirmed | Unconfirmed | Unconfirmed | Unconfirmed | Unconfirmed |

TABLE 3-continued

Alignment of liquid crystal molecules in liquid crystal film
Functional group of trimethoxysilane-based or dimethoxysilane-based coupling agent

| Base film or alignment film | KBM-5103 Acryloxy group | KBM-503 Methacryloxy group | KBM-1003 Vinyl group | KBM-803 Mercapto group | KBM-703 Chloropropyl group | KBE-5102 Bifunctional acryloxy group | KBM-403 Epoxy group |
|---|---|---|---|---|---|---|---|
| Carboxylic acid-modified PVA alignment film *7 | Hybrid | Unconfirmed | Unconfirmed | Unconfirmed | Unconfirmed | Horizontal | Unconfirmed |
| Partially saponified PVA alignment film *6 | Vertical alignment | Unconfirmed | Unconfirmed | Unconfirmed | Unconfirmed | Horizontal | Unconfirmed |

Table 3 Note:
*1 through *3 and *5 through *7 are as described in Table 1.
*10: TAC base film (T80UZ, Fuji Film)
PVA alignment film (PVA-117, Kuraray, Saponification rate: 99%)

As can be seen from Table 3, when the functional group of the alkoxysilane compound in the liquid crystal film is any of acryloxy, methacryloxy, vinyl, mercapto, chloropropyl, and epoxy group, the liquid crystal molecules in the liquid crystal film align in a hybrid or vertical alignment.

EXAMPLE 4

Polymerizable Liquid Crystal Compound Mixed with Trialkoxysilane Compound Prior to Hydrolysis of Trialkoxysilane Compound 100 parts by weight of a nematic polymerizable liquid crystal compound (RMM34, Merck Germany) (containing 20 wt % of 4-cyanophenyl ester of 4-(6-acryloyloxyhexyloxy)benzoic acid (Compound of the formula (13))), 5 parts by weight of a photopolymerization initiator (Irgacure 907, Ciba Specialty Chemicals), and 200 parts by weight of propyleneglycol monomethyl ether acetate were mixed together. To this mixture, 5 wt % of a mixture of an acryloxy group-containing trimethoxysilane-based coupling agent (KBM-5103, Shin-Etsu Chemical) and water (with 1 wt % acetic acid), containing 4.5 mol of water for each mole of the silane coupling agent, was added. The resulting mixture was stirred in a jar-mill oven at 60° C. for 20 hours to give a liquid crystal film composition. As in Example 1, this composition was used to make an optically anisotropic film. The film was evaluated for the alignment of liquid crystal molecules in the liquid crystal film by phase difference measurement. The results are shown in Table 4. For comparison, a water-free liquid crystal film composition was prepared and was likewise used to make an optical anisotropic film. The film was evaluated for the alignment of liquid crystal molecules in the liquid crystal film by phase difference measurement.

TABLE 4

| Base film or alignment film | | Coupling agent mixed with polymerizable liquid crystal compound prior to hydrolysis | Coupling agent mixed with polymerizable liquid crystal compound without hydrolysis |
|---|---|---|---|
| Non-saponified TAC base film *1 | Alignment of LC | Horizontal | Horizontal |
| | Appearance | Uniform | Uniform |
| Saponified TAC base film *2 | Alignment of LC | Hybrid | Horizontal |
| | Appearance | Nonuniform | Uniform |
| Glass substrate *3 | Alignment of LC | Hybrid | Horizontal + uneven |
| | Appearance | Nonuniform | Nonuniform |
| HC-applied TAC base film *4 | Alignment of LC | Hybrid | Horizontal |
| | Appearance | Nonuniform | Nonuniform |
| Fully saponified PVA alignment film *5 | Alignment of LC | Horizontal | Horizontal |
| | Appearance | Uniform | Uniform |
| Partially saponified PVA alignment film *6 | Alignment of LC | Horizontal | Horizontal |
| | Appearance | Uniform | Uniform |
| Carboxylic acid-modified PVA alignment film *7 | Alignment of LC | Horizontal | Horizontal |
| | Appearance | Uniform | Uniform |
| Polyimide alignment film *8 | Alignment of LC | Horizontal | Horizontal |
| | Appearance | Uniform | Uniform |
| Polyimide alignment film *9 | Alignment of LC | Hybrid | Hybrid |
| | Appearance | Uniform | Uniform |

Table 4 Note:
*1 through *9 are as described in Table 1.

As can be seen from Table 4, substantially the same results were obtained when alkoxysilane compound was hydrolyzed after mixed with the polymerizable liquid crystal compound.

EXAMPLE 5

As in Examples 1 through 4, liquid crystal films were obtained using a peelable base (Lumirror PET T60, Toray) as the coating base. Using a tackifier (G4100, Sony Chemical), each of the liquid crystal films was transferred/laminated to a clear TAC base film (T80UZ, Fuji Film), and the peelable base was removed to make an optically anisotropic material. As in Example 1, each material was evaluated for horizontal alignment, hybrid alignment and homeotropic alignment: Similar horizontal alignment, hybrid alignment and homeotropic alignment were observed.

EXAMPLE 6

As in Examples 1 through 4, liquid crystal films were obtained using a peelable base (Lumirror PET T60, Toray) as the coating base. Using a UV-curable tackifier (a mixture of 100 parts by weight of phenoxyethylacrylate (Biscoat 192#, Osaka Organic Chemical Industry) with 3 parts by weight of a photopolymerization initiator (Irgacure 907, Ciba Specialty Chemicals)), each of the liquid crystal films was laminated onto a clear TAC base film (T80UZ, Fuji Film). Using a metal halide lamp, the film was exposed to light at maximum luminance of 200 mW/cm$^2$ to a cumulative dose of 800 mJ/cm$^2$ to cure the film and thereby adhere it to the base film. Subsequently, the peelable base was removed to obtain an optically anisotropic material. As in Example 1, each material was evaluated for horizontal alignment, hybrid alignment and homeotropic alignment: Similar horizontal alignment, hybrid alignment and homeotropic alignment were observed.

INDUSTRIAL APPLICABILITY

According to the present invention, hybrid alignment or vertical alignment can be easily introduced into liquid crystal films, which, by their nature, tend to have a horizontal alignment of liquid crystal molecules, without using a special alignment film. optically anisotropic films using such a liquid crystal film are suitable, either by themselves or in conjunction with other films, for use as phase difference film, viewing angle-compensating film, color-compensating film, or elliptical polarization film. The optically anisotropic films of the present invention are also suitable for use in liquid crystal displays.

The invention claimed is:

1. A liquid crystal composition for forming an optically anisotropic film, comprising a polymerizable liquid crystal compound and a hydrolysate of an alkoxysilane compound.

2. The composition for forming an optically anisotropic film according to claim 1, wherein the hydrolysate of the alkoxysilane compound contains a siloxane oligomer.

3. The composition for forming an optically anisotropic film according to claim 2, wherein a degree of polymerization of the siloxane oligomer is from 2 to 25.

4. The composition for forming an optically anisotropic film according to claim 1, wherein the alkoxysilane compound is a trialkoxysilane compound having a functional group.

5. The composition for forming an optically anisotropic film according to claim 1, wherein a functional group is any of vinyl group, epoxy group, (meth)acryloxy group, mercapto group and halogen atom.

6. The composition for forming an optically anisotropic film according to claim 1, wherein the polymerizable liquid crystal compound contains a rod-shaped polymerizable nematic liquid crystal compound.

7. The composition for forming an optically anisotropic film according to claim 6, wherein the polymerizable liquid crystal compound contains a compound represented by the following general formula (1):

(1)

wherein R$^3$ is hydrogen or a methyl group; and c is an integer from 2 to 12.

8. The composition for forming an optically anisotropic film according to claim 1, wherein the hydrolysate of the alkoxysilane compound is present in an amount of 0.1 to 40 wt %.

9. The composition for forming an optically anisotropic film according to claim 1, wherein the hydrolysate of the alkoxysilane compound is obtained by hydrolyzing one mole of the alkoxysilane compound with 0.1d to 2.0d mol of water, given that the number of alkoxyl groups in a molecule of the alkoxysilane compound is d.

10. A method for producing a liquid crystal film composition containing a polymerizable liquid crystal compound and a hydrolysate of an alkoxysilane compound, wherein the alkoxysilane compound is hydrolyzed to obtain the hydrolysate, which is then uniformly mixed with the polymerizable liquid crystal compound, or the alkoxysilane compound is first uniformly mixed with the polymerizable liquid crystal compound and the alkoxysilane compound is subsequently hydrolyzed in the mixture.

11. The production method according to claim 10, wherein one mole of the alkoxysilane compound is hydrolyzed with 0.1d to 2.0d mol of water, given that the number of alkoxyl groups in a molecule of the alkoxysilane compound is d.

12. An optically anisotropic film comprising a base film and a liquid crystal film obtained by applying to the base film the composition for forming a liquid crystal film according to claim 1 and then curing the composition, wherein the alignment of the liquid crystal molecules in the liquid crystal film is fixed in a nematic alignment.

13. The optically anisotropic film according to claim 12, wherein the nematic alignment is a nematic hybrid alignment or a nematic homeotropic (vertical) alignment.

14. A method for producing an optically anisotropic film, comprising applying to a base film the composition for forming a liquid crystal film according to claim 1; causing the polymerizable liquid crystal compound to align in a nematic alignment; and while maintaining the alignment, curing the polymerizable liquid crystal compound to form a liquid crystal film.

15. A method for producing an optically anisotropic film, comprising applying to a peelable film the composition for forming a liquid crystal film according to claim 1; causing the polymerizable liquid crystal compound to align in a nematic alignment; while maintaining the alignment, curing the polymerizable liquid crystal compound to form a liquid crystal film; and transferring the liquid crystal film onto a base film using a tackifier or an adhesive.

16. A liquid crystal display having a liquid crystal panel and the optically anisotropic film according to claim 12 applied on at least one surface of the liquid crystal panel.

* * * * *